(12) United States Patent
Chang et al.

(10) Patent No.: US 7,234,036 B1
(45) Date of Patent: Jun. 19, 2007

(54) METHOD AND APPARATUS FOR RESOLVING PHYSICAL BLOCKS ASSOCIATED WITH A COMMON LOGICAL BLOCK

(75) Inventors: Robert C. Chang, Danville, CA (US); Bahman Qawami, San Jose, CA (US); Farshid Sabet-Sharghi, San Jose, CA (US)

(73) Assignee: SanDisk Corporation, Milpitas, CA (US)

(*) Notice: Subject to any disclaimer, the term of this patent is extended or adjusted under 35 U.S.C. 154(b) by 306 days.

(21) Appl. No.: 10/281,762

(22) Filed: Oct. 28, 2002

(51) Int. Cl.
*G06F 12/02* (2006.01)
(52) U.S. Cl. ........................ 711/202; 711/103
(58) Field of Classification Search ................ 711/103, 711/115, 156, 202, 203; 345/556, 568; 365/185.11, 365/185.33; 714/766
See application file for complete search history.

(56) References Cited

U.S. PATENT DOCUMENTS

| | | | |
|---|---|---|---|
| 5,166,939 A * | 11/1992 | Jaffe et al. ................ | 714/766 |
| 5,222,109 A | 6/1993 | Pricer ........................ | 377/24.1 |
| 5,297,148 A | 3/1994 | Harari et al. ............... | 371/10.2 |
| 5,388,083 A | 2/1995 | Assar et al. ................ | 365/218 |
| 5,438,573 A | 8/1995 | Mangan et al. ............. | 371/10.3 |
| 5,544,312 A | 8/1996 | Hasbun et al. | |
| 5,568,439 A | 10/1996 | Harari ........................ | 365/218 |
| 5,598,370 A | 1/1997 | Niijima et al. ........... | 365/185.33 |
| 5,835,935 A | 11/1998 | Estakhri et al. ............. | 711/103 |
| 5,845,313 A | 12/1998 | Estakhri et al. ............. | 711/103 |
| 5,860,082 A | 1/1999 | Smith et al. ................ | 711/103 |
| 5,907,856 A | 5/1999 | Estakhri et al. ............. | 711/103 |
| 5,924,113 A * | 7/1999 | Estakhri et al. ............. | 711/103 |
| 6,016,275 A | 1/2000 | Han ........................ | 365/185.29 |
| 6,081,447 A | 6/2000 | Lofgren et al. ........... | 365/185.02 |
| 6,115,785 A * | 9/2000 | Estakhri et al. ............. | 711/103 |
| 6,125,435 A | 9/2000 | Estakhri et al. ............. | 711/201 |

(Continued)

FOREIGN PATENT DOCUMENTS

EP   1 197 868 A2   4/2002

(Continued)

OTHER PUBLICATIONS

Kim, Jesung et al., "A Space-Efficient Flash Translation Layer for Compactflash Systems", IEEE Transactions on Consumer Electronics, vol. 48, No. 2, May 2002.

*Primary Examiner*—Kevin L. Ellis
*Assistant Examiner*—Kaushik Patel
(74) *Attorney, Agent, or Firm*—Anderson, Levine & Lintel

(57) ABSTRACT

Methods and apparatus for determining which of a plurality of physical blocks associated with a logical block is more recently associated with the logical block are disclosed. According to one aspect of the present invention, a method for resolving associations of a first physical block and a second physical block to a logical block associated with a non-volatile memory system includes obtaining a first identifier associated with the first physical block and obtaining a second identifier associated with the second physical block. The identifiers are compared to ascertain whether the first identifier indicates that the first physical block is more recently associated with the logical block. The method also includes completing an operation arranged to provide contents associated with the logical block to the first physical block when it is determined that the first identifier indicates that the first physical block is more newly associated with the logical block.

25 Claims, 8 Drawing Sheets

U.S. PATENT DOCUMENTS

| | | | |
|---|---|---|---|
| 6,151,247 A * | 11/2000 | Estakhri et al. | 365/185.11 |
| 6,230,233 B1 | 5/2001 | Lofgren et al. | 711/103 |
| 6,260,156 B1 | 7/2001 | Garvin et al. | 714/8 |
| 6,426,893 B1 | 7/2002 | Conley et al. | 365/185.11 |
| 6,845,438 B1 * | 1/2005 | Tanaka et al. | 711/206 |
| 2001/0054129 A1 | 12/2001 | Wouters | |
| 2003/0147278 A1 * | 8/2003 | Tanaka et al. | 365/185.03 |

FOREIGN PATENT DOCUMENTS

| | | |
|---|---|---|
| JP | 62-283496 | 12/1987 |
| JP | 62-283497 | 12/1987 |
| WO | 02/058074 | 7/2002 |

* cited by examiner

METHOD AND APPARATUS FOR RESOLVING PHYSICAL BLOCKS ASSOCIATED WITH A COMMON LOGICAL BLOCK

CROSS REFERENCE TO RELATED APPLICATIONS

The present invention is related to co-pending U.S. patent application Ser. No. 10/281,739 entitled "WEAR LEVELING IN NON-VOLATILE STORAGE SYSTEMS", filed Oct. 28, 2002; co-pending U.S. patent application Ser. No. 10/281,670 entitled "TRACKING THE MOST FREQUENTLY ERASED BLOCKS IN NON-VOLATILE MEMORY SYSTEMS", filed Oct. 28, 2002, co-pending U.S. patent application Ser. No. 10/281,824 entitled "TRACKING THE LEAST FREQUENTLY ERASED BLOCKS IN NON-VOLATILE MEMORY SYSTEMS", filed Oct. 28, 2002, co-pending U.S. patent application Ser. No. 10/281,631 entitled "METHOD AND APPARATUS FOR SPLITTING A LOGIC BLOCK", filed Oct. 28, 2002; co-pending U.S. patent application Ser. No. 10/281,855 entitled "METHOD AND APPARATUS FOR GROUPING PAGES WITHIN A BLOCK," filed Oct. 28, 2002; co-pending U.S. patent application Ser. No. 10/281,696 entitled "MAINTAINING ERASE COUNTS IN NON-VOLATILE STORAGE SYSTEMS", filed Oct. 28, 2002 and now issued as U.S. Pat. No. 6,831,865; co-pending U.S. patent application Ser. No. 10/281,626 entitled "METHOD AND APPARATUS FOR MANAGING AN ERASE COUNT BLOCK", filed Oct. 28, 2002; and co-pending U.S. patent application Ser. No. 10/281,804 entitled "METHOD AND APPARATUS FOR PERFORMING MULTI-PAGE READ AND WRITE OPERATIONS IN A NON-VOLATILE MEMORY," filed Oct. 28, 2002; which are each incorporated herein by reference in their entireties.

BACKGROUND OF THE INVENTION

1. Field of Invention

The present invention relates generally to mass digital data storage systems. More particularly, the present invention relates to systems and methods for efficiently enabling a plurality of physical blocks associated with a common logical block to be substantially resolved into a single physical block.

2. Description of the Related Art

The use of non-volatile memory systems such as flash memory storage systems is increasing due to the compact physical size of such memory systems, and the ability for non-volatile memory to be repetitively reprogrammed. The compact physical size of flash memory storage systems facilitates the use of such storage systems in devices which are becoming increasingly prevalent. Devices which use flash memory storage systems include, but are not limited to, digital cameras, digital camcorders, digital music players, handheld personal computers, and global positioning devices. The ability to repetitively reprogram non-volatile memory included in flash memory storage systems enables flash memory storage systems to be used and reused.

In general, flash memory storage systems may include flash memory cards and flash memory chip sets. Flash memory chip sets generally include flash memory components and a controller components. Typically, a flash memory chip set may be arranged to be assembled into an embedded system. The manufacturers of such assemblies or host systems typically acquire flash memory in component-form, as well as other components, then assemble the flash memory and the other components into a host system.

Within a file system associated with a flash memory system, memory is effectively divided into a system or directory area and a data area. The system area generally includes root directories and file allocation tables (FATs), while data files are typically included in the data area. A file system may write data in sectors, e.g., one page at a time, into physical blocks associated with the system area, while writing data in clusters, e.g., multiple pages at a time, into the data area.

Any updates associated with a logical block, or a block that is associated with a file system, are effectively propagated to a physical block which is mapped to the logical block. When the physical block which is mapped to the logical block is full, or is otherwise unable to accept an update, then a spare physical block is generally obtained, and the most recent data associated with the logical block is either copied, e.g., directly copied from the current physical block, or merged, e.g., substantially copied along with the update, into the spare physical block.

FIG. 1 is a diagrammatic representation of a logical block, a current physical block that is associated with the logical block, and a spare physical block that is to replace the current physical block. A logical block 200 is mapped to a physical block 210. Specifically, contents associated with pages 202 within logical block 200 are stored in a data area of pages 212 of physical block 210 as contents 214. When pages 212 within physical block 210 are full (as shown), or are otherwise unable to accept an update associated with logical block 200, a new or spare physical block 220, which includes pages 222, may be obtained, as for example from a set of spare blocks. The most recent contents 214 stored in physical block 210, along with any updates associated with logical block 200 that are not stored into physical block 210, may be copied into physical block 220 such that physical block 220 is effectively an up-to-date physical representation of logical block 200.

At times, interruptions may occur during the course of copying or merging contents 214 from physical block 210 into physical block 220 which cause the copying or merging process to be aborted and, as a result, incomplete. By way of example, power to a non-volatile memory device which includes physical blocks 210, 220 may be lost before the completion of a copying or merging process. When power is lost before the completion of a copying or merging process, some data associated with contents 210 may be lost.

To minimize the amount of data that may be lost as a result of an interrupted copying or merging process, physical block 210 and physical block 220 may be studied to determine which of physical block 210 and physical block 220 is an old physical block and which is a new, unfinished physical block. As will be understood by those skilled in the art, when a copying or merging process is interrupted, it may be time-consuming and difficult to determine whether physical block 210 or physical block 220 is intended to be the new physical block that contains up-to-date contents and is to be associated with logical block 200.

In order to facilitate a determination of which of two physical blocks may be intended to be the new physical block that is associated with a given logical block, flags are often implemented for use with the physical blocks. One method of implementing flags for use with physical blocks is described in U.S. Pat. No. 6,115,785, which is incorporated herein by reference in its entirety. Although the use of flags may be useful in enabling physical blocks which are in a copying or a merging process to be identified, it is often difficult to determine which of two physical blocks is a newer physical block and which is an older physical block. In addition, the use of flags often requires a partial write process when identifying physical blocks as being in either a copying or a merging process.

Therefore, what is desired is a process and a system which enables data to be efficiently restored when a copying or a merging process performed on physical blocks is interrupted before completion. That is, what is needed is a method and an apparatus for efficiently enabling a determination to be made as to which of a plurality of physical blocks is a new physical block that is intended to correspond to a particular logical block, and for enabling the most up-to-date data associated with the logical block to be provided to the new physical block.

SUMMARY OF THE INVENTION

The present invention relates to a system and a method for determining which of a plurality of physical blocks associated with a logical block is more recently associated with the logical block. According to one aspect of the present invention, a method for resolving associations of a first physical block and a second physical block to a logical block associated with a non-volatile memory system includes obtaining a first identifier associated with the first physical block and obtaining a second identifier associated with the second physical block. The identifiers are compared to ascertain whether the first identifier indicates that the first physical block is more recently associated with the logical block. The method also includes completing an operation arranged to provide contents associated with the logical block to the first physical block when it is determined that the first identifier indicates that the first physical block is more newly associated with the logical block.

In one embodiment, obtaining the first identifier includes obtaining the first identifier from an overhead area associated with the first physical block and obtaining the second identifier includes obtaining the second identifier from an overhead area associated with the second physical block. In another embodiment, comparing the first identifier with the second identifier to determine when the first identifier indicates that the first physical block is more newly associated with the logical block includes determining when the first identifier has a value that is higher than a value of the second identifier.

When one physical block is being copied into another and a system which includes the blocks is shut off or otherwise loses power, then there will generally be two physical blocks which correspond to the same logical block. By maintaining an identifier, e.g., an update index, in each physical block and comparing the identifiers, it may readily and efficiently be determined which of the two physical blocks was being copied or merged into the other. As such, contents of both blocks may be studied, and a copy or a merge operation may effectively be reinstated to enable information associated with a corresponding logical block to be provided to the block intended to receive at least some of the contents of the other block. As such, the loss of data as a result of a system shut down or a loss of power may effectively be minimized.

According to another aspect of the present invention, a method for associating a second physical block with a logical block that already has an associated first physical block which contains contents associated with the logical block includes obtaining the second physical block, and setting a second indicator associated with the second physical block to a value which is different from a value of a first indicator associated with the first physical block. Once the second indicator is set, an operation may be initiated to provide at least some of the contents contained in the first physical block to the second physical block. In one embodiment, the method also includes retrieving the first indicator from the first physical block, and determining the value of the first indicator.

In another embodiment, the method also includes storing the second indicator in the second physical block. In such an embodiment, storing the second indicator in the second physical block may include storing the second indicator in a redundant area associated with the physical block.

According to still another aspect of the present invention, a non-volatile memory includes a first physical block and a second physical block. The first physical block includes at least a first page that has a first overhead area in which a first set of bits is stored. The second physical block includes at least a second page which has a second overhead area in which a second set of bits is stored. The first physical block and the second physical block are both associated with a logical block. The first set of bits and the second set of bits are arranged to be compared to determine whether the first physical block is more newly associated with the logical block than the second physical block.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

The loss of power to a memory system may generally cause a multitude of problems within the memory system. The problems include, but are not limited to, data being lost when power is lost during a process of copying the contents of one physical block into another physical block. In order to prevent the loss of data when a copy process is interrupted, flags may be included in physical blocks which indicate whether contents physical blocks are in the process of being copied. The use of flags, however, often proves to be inefficient.

In order to facilitate a determination regarding which of two physical blocks that correspond to a particular logical block is an unfinished, or new, physical block which is to replace an old, or current, physical block, update indexes may be implemented in the physical blocks. An update index, which may be stored in at least one redundant area associated with a physical block, may be arranged to indicate which of two physical blocks involved in a copying, or a merging, is an old physical block and which of the two physical blocks is the new physical block, or the physical block into which contents are being copied. For example, the update index of the new physical block may be set such that the value of that update index is higher than the update index of the old physical block. Hence, when the update indexes of the physical blocks are checked to determine which physical block is the new physical block, it may be determined that the physical block with the higher update index is the new physical block.

The use of update indexes generally uses only one incrementation, or write step, as substantially only the update index of a new physical block is incremented or otherwise updated when a copy or a merge process is to occur. In addition, when the copy or merge process is completed, the update indexes typically are not updated. As a result, the use of update indexes typically consumes less overhead than the use of flags.

Update indexes are typically used in systems in which there is constraint that specifies that no partial writes are to occur. In other words, update indexes may be implemented within systems in which no partial writes are allowed. However, it should be appreciated that update indexes may also be implemented in systems in which partial writes are allowed.

Figure 1:
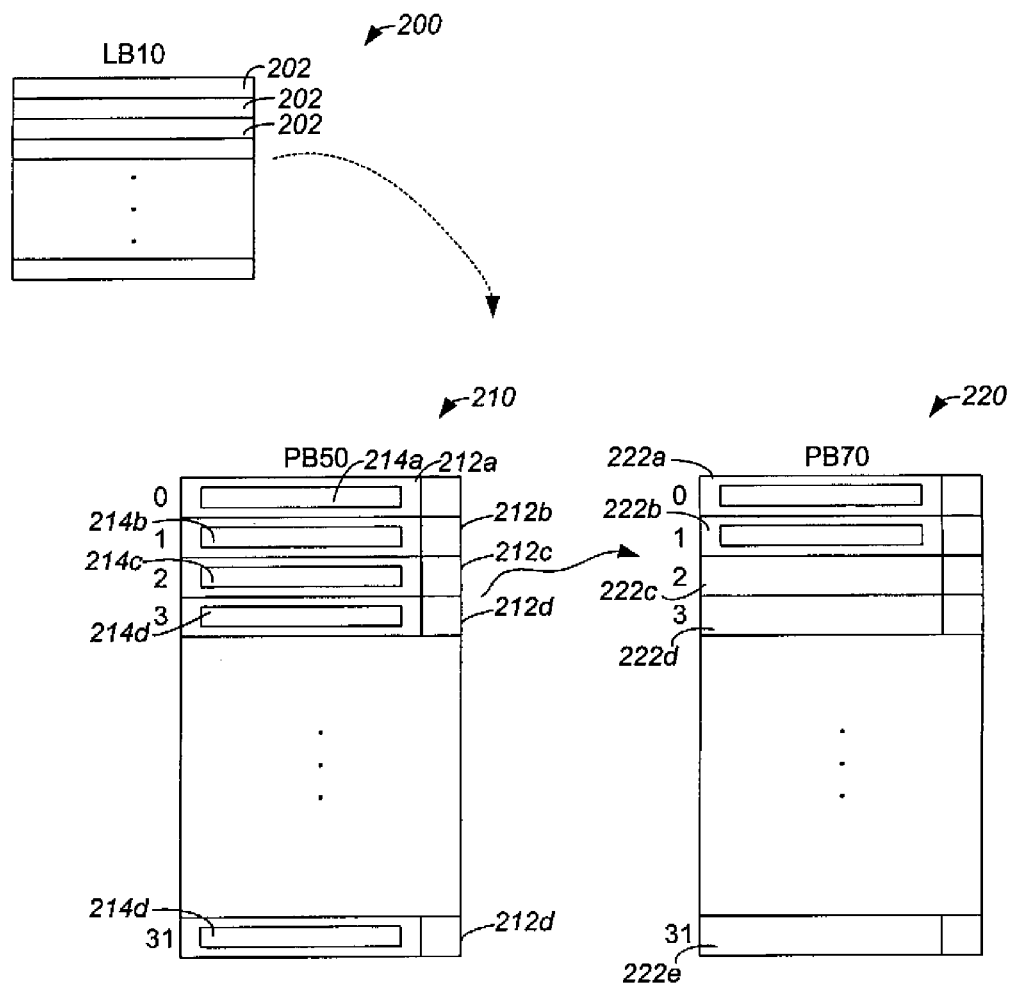
FIG. 1 is a diagrammatic representation of a logical block, a current physical block that is associated with the logical block, and a spare physical block that is to replace the current physical block.
Figure 2:
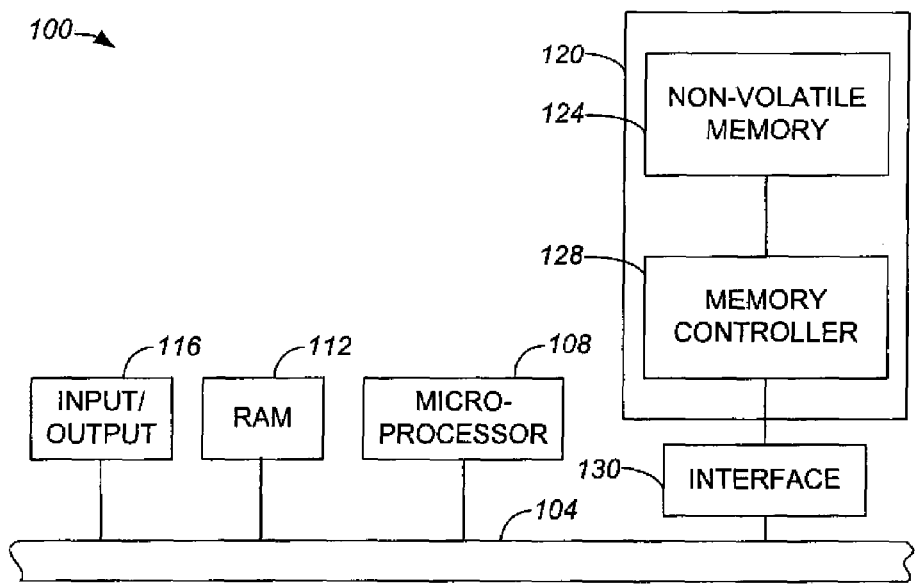
FIG. 2 is a diagrammatic representation of a general host system which includes a non-volatile memory.

Flash memory systems or, more generally, non-volatile memory devices which may benefit from the use of update indexes within physical blocks generally include flash memory cards and chip sets. Typically, flash memory systems are used in conjunction with a host system such that the host system may write data to or read data from the flash memory systems. However, some flash memory systems include embedded flash memory and software which executes on a host to substantially act as a controller for the embedded flash memory, as will be discussed below with respect to FIG. 4. Referring to FIG. 2, a general host system which includes a non-volatile memory device, e.g., a CompactFlash memory card, will be described. A host or computer system 100 generally includes a system bus 104 which allows a microprocessor 108, a random access memory (RAM) 112, and input/output circuits 116 to communicate. It should be appreciated that host system 100 may generally include other components, e.g., display devices and networking device, which are not shown for purposes of illustration.

In general, host system 100 may be capable of capturing information including, but not limited to, still image information, audio information, and video image information. Such information may be captured in real-time, and may be transmitted to host system 100 in a wireless manner. While host system 100 may be substantially any system, host system 100 is typically a system such as a digital camera, a video camera, a cellular communications device, an audio player, or a video player. It should be appreciated, however, that host system 100 may generally be substantially any system which stores data or information, and retrieves data or information.

Host system 100 may also be a system which either only captures data, or only retrieves data. That is, host system 100 may be, in one embodiment, a dedicated system which stores data, or host system 100 may be a dedicated system which reads data. By way of example, host system 100 may be a memory writer which is arranged only to write or store data. Alternatively, host system 100 may be a device such as an MP3 player which is typically arranged to read or retrieve data, and not to capture data.

A non-volatile memory device 120 which, in one embodiment, is a removable non-volatile memory device, is arranged to interface with bus 104 to store information. An optional interface block 130 may allow non-volatile memory device 120 to interface indirectly with bus 104. When present, input/output circuit block 116 serves to reduce loading on bus 104, as will be understood by those skilled in the art. Non-volatile memory device 120 includes non-volatile memory 124 and an optional memory control system 128. In one embodiment, non-volatile memory device 120 may be implemented on a single chip or a die. Alternatively, non-volatile memory device 120 may be implemented on a multi-chip module, or on multiple discrete components which may form a chip set and may be used together as non-volatile memory device 120. One embodiment of non-volatile memory device 120 will be described below in more detail with respect to FIG. 3.

Non-volatile memory 124, e.g., flash memory such as NAND flash memory, is arranged to store data such that data may be accessed and read as needed. Data stored in non-volatile memory 124 may also be erased as appropriate, although it should be understood that some data in non-volatile memory 124 may not be erasable. The processes of storing data, reading data, and erasing data are generally controlled by memory control system 128 or, when memory control system 128 is not present, by software executed by microprocessor 108. The operation of non-volatile memory 124 may be managed such that the lifetime of non-volatile memory 124 is substantially maximized by essentially causing sections of non-volatile memory 124 to be worn out substantially equally.

Non-volatile memory device 120 has generally been described as including an optional memory control system 128, i.e., a controller. Often, non-volatile memory device 120 may include separate chips for non-volatile memory 124 and memory control system 128, i.e., controller, functions. By way of example, while non-volatile memory devices including, but not limited to, PC cards, CompactFlash cards, MultiMedia cards, and secure digital cards include controllers which may be implemented on a separate chip, other non-volatile memory devices may not include controllers that are implemented on a separate chip. In an embodiment in which non-volatile memory device 120 does not include separate memory and controller chips, the memory and controller functions may be integrated into a single chip, as will be appreciated by those skilled in the art. Alternatively, the functionality of memory control system 128 may be provided by microprocessor 108, as for example in an embodiment in which non-volatile memory device 120 does not include memory controller 128, as discussed above.

Figure 3:
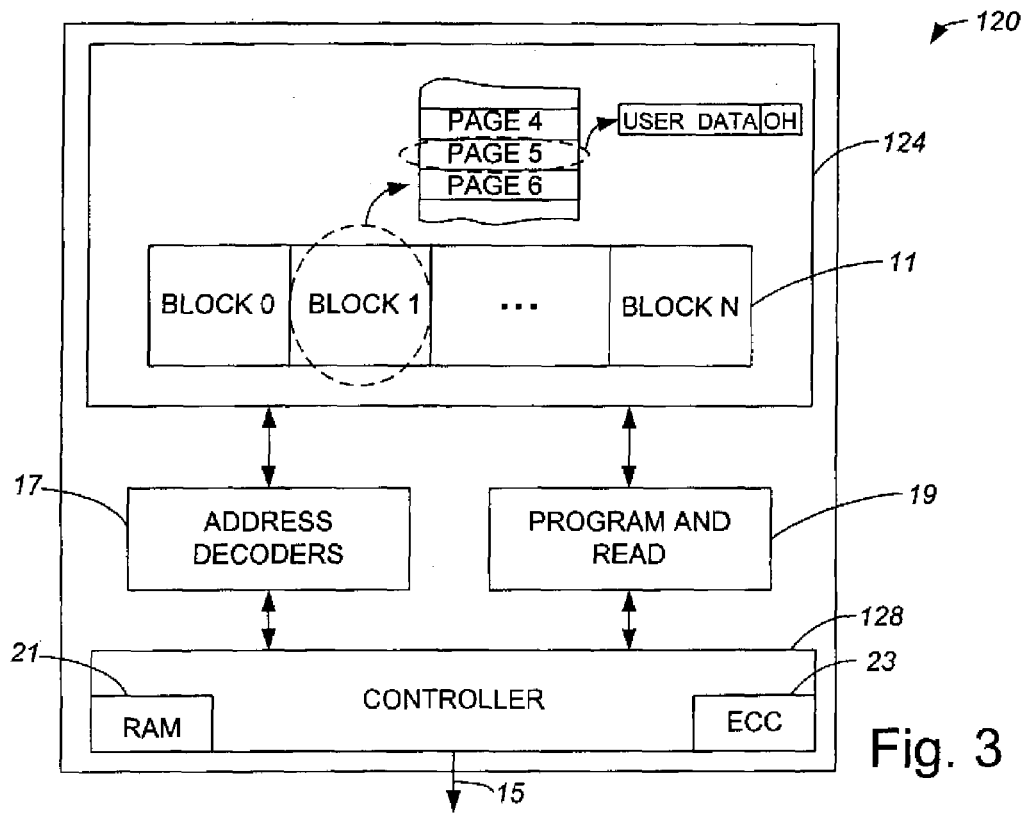
FIG. 3 is a diagrammatic representation a memory device, e.g., memory device 120 of FIG. 2.

With reference to FIG. 3, non-volatile memory device 120 will be described in more detail in accordance with an embodiment of the present invention. As described above, non-volatile memory device 120 includes non-volatile memory 124 and may include memory control system 128. Memory 124 and control system 128, or controller, may be primary components of non-volatile memory device 120, although when memory 124 is an embedded NAND device, for example, non-volatile memory device 120 may not include control system 128. Memory 124 may be an array of memory cells formed on a semiconductor substrate, wherein one or more bits of data are stored in the individual memory cells by storing one of two or more levels of charge on individual storage elements of the memory cells. A non-volatile flash electrically erasable programmable read only memory (EEPROM) is an example of a common type of memory for such systems.

When present, control system 128 communicates over a bus 15 to a host computer or other system that is using the memory system to store data. Bus 15 is generally a part of bus 104 of FIG. 2. Control system 128 also controls operation of memory 124, which may include a memory cell array 11, to write data provided by the host, read data requested by the host and perform various housekeeping functions in operating memory 124. Control system 128 generally includes a general purpose microprocessor which has associated non-volatile software memory, various logic circuits, and the like. One or more state machines are often also included for controlling the performance of specific routines.

Memory cell array 11 is typically addressed by control system 128 or microprocessor 108 through address decoders 17. Decoders 17 apply the correct voltages to gate and bit lines of array 11 in order to program data to, read data from, or erase a group of memory cells being addressed by the control system 128. Additional circuits 19 include programming drivers that control voltages applied to elements of the array that depend upon the data being programmed into an addressed group of cells. Circuits 19 also include sense amplifiers and other circuits necessary to read data from an addressed group of memory cells. Data to be programmed into array 11, or data recently read from array 11, are typically stored in a buffer memory 21 within control system 128. Control system 128 also usually contains various registers for temporarily storing command and status data, and the like.

Array 11 is divided into a large number of BLOCKS 0–N memory cells. As is common for flash EEPROM systems, the block is typically the smallest unit of erase. That is, each block contains the minimum number of memory cells that are erased together. Each block is typically divided into a number of pages. As will be appreciated by those skilled in the art, a page may be the smallest unit of programming. That is, a basic programming operation writes data into or reads data from a minimum of one page of memory cells. One or more sectors of data are typically stored within each page. As shown in FIG. 3, one sector includes user data and overhead data. Overhead data typically includes an error correction code (ECC) that has been calculated from the user data of the sector. A portion 23 of the control system 128 calculates the ECC when data is being programmed into array 11, and also checks the ECC when data is being read from array 11. Alternatively, the ECCs are stored in different pages, or different blocks, than the user data to which they pertain.

A sector of user data is typically 512 bytes, corresponding to the size of a sector in magnetic disk drives. Overhead data, or redundant data, is typically an additional 16 bytes. One sector of data is most commonly included in each page but two or more sectors may instead form a page. Any number of pages may generally form a block. By way of example, a block may be formed from eight pages up to 512, 1024 or more pages. The number of blocks is chosen to provide a desired data storage capacity for the memory system. Array 11 is typically divided into a few sub-arrays (not shown), each of which contains a proportion of the blocks, which operate somewhat independently of each other in order to increase the degree of parallelism in the execution of various memory operations. An example of the use of multiple sub-arrays is described in U.S. Pat. No. 5,890,192, which is incorporated herein by reference in its entirety.

Figure 4:
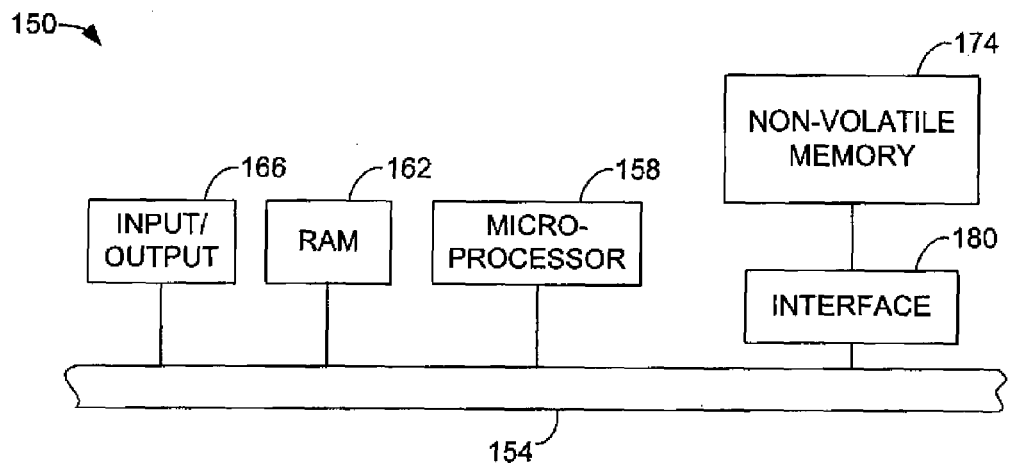
FIG. 4 is a diagrammatic representation of a host system which includes an embedded non-volatile memory.

In one embodiment, non-volatile memory is embedded into a system, e.g., a host system. FIG. 4 is a diagrammatic representation of a host system which includes an embedded non-volatile memory. A host or computer system 150 generally includes a system bus 154 which allows a microprocessor 158, a RAM 162, and input/output circuits 166, among other components (not shown) of host system 150, to communicate. A non-volatile memory 174, e.g., a flash memory, allows information to be stored within host system 150. An interface 180 may be provided between non-volatile memory 174 and bus 154 to enable information to be read from and written to non-volatile memory 174.

Non-volatile memory 174 may be managed by microprocessor 158 which effectively executes either or both software and firmware which is arranged to control non-volatile memory 174. That is, microprocessor 158 may run code devices (not shown), i.e., software code devices or firmware code devices, which allow non-volatile memory 174 to be controlled. Such code devices, which may be a flash memory packaged with CPU inside microprocessor 158, a separate flash ROM, or inside non-volatile memory 174, which will be described below, may enable physical blocks in non-volatile memory 174 to be addressed, and may enable information to be stored into, read from, and erased from the physical blocks.

Figure 5:
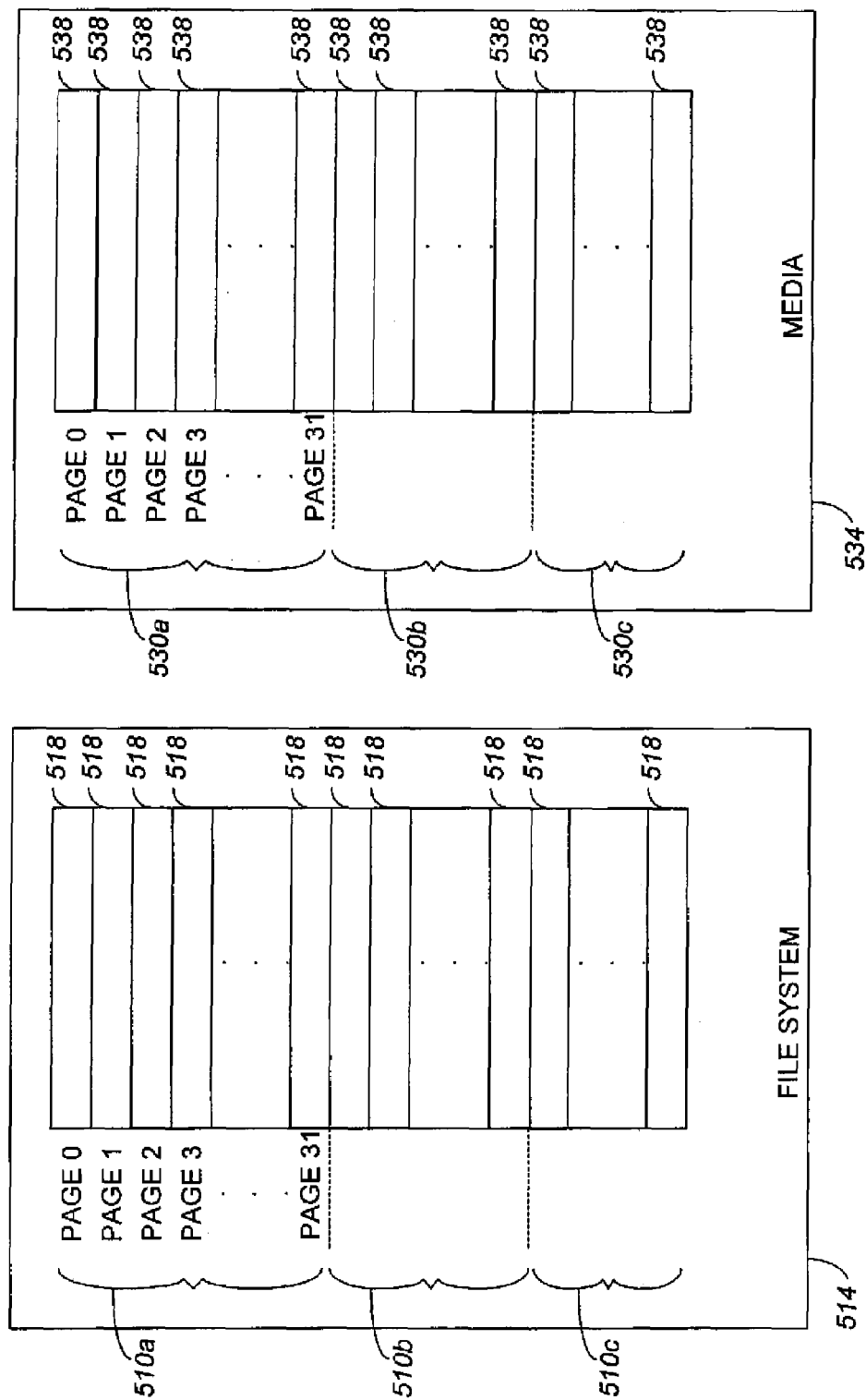
FIG. 5 is a diagrammatic representation of a file system with logical blocks and a media with physical blocks in accordance with an embodiment of the present invention.

In general, when a user writes data, the user effectively writes data using a file system. The file system associates the data with a logical block or, more specifically, pages of a logical block, that is mapped to a physical block associated with a storage media. FIG. 5 is a diagrammatic representation of a file system with logical blocks and a media with physical blocks in accordance with an embodiment of the present invention. Logical blocks 510 of a file system 514 include any number of pages 518. The number of pages 518 included in a logical block, e.g., logical block 510a, depends on the size of an erase unit. For example, approximately thirty-two pages may be included in logical block 510a, as shown, when the smallest erase unit contains approximately thirty-two pages.

Physical blocks 530 of a media 534, e.g., an embedded flash memory, include a number of pages 538. As will be appreciated by those skilled in the art, the number of pages 538 included in physical blocks 530 is typically the same as the number of pages 518 included in logical blocks 510. However, the number of pages 518 included in logical blocks 510 may not necessarily be the same as the number of pages 538 included in physical blocks 530.

Figure 6:
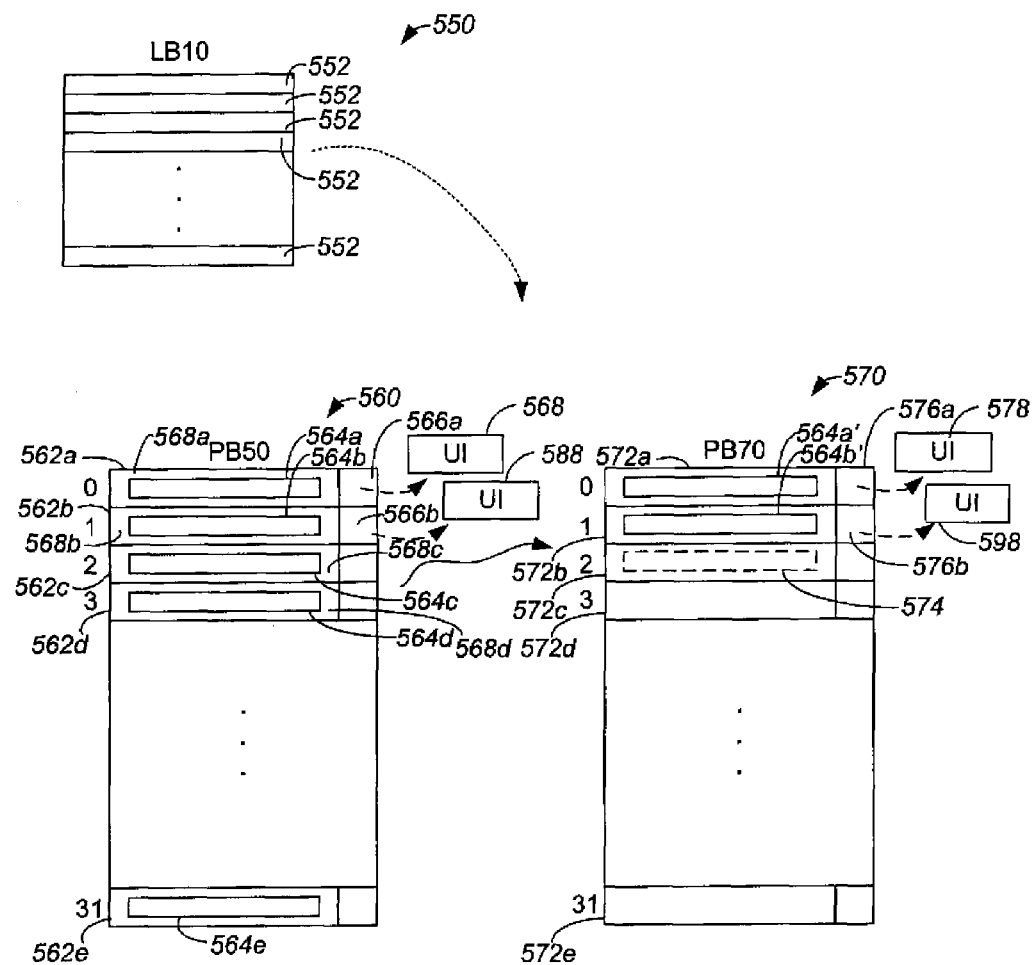
FIG. 6 is a diagrammatic representation of a logical block which is associated with more than one physical block which has an update index in accordance with an embodiment of the present invention.

FIG. 6 is a diagrammatic representation of a logical block which is associated with more than one physical block which has an update index in accordance with an embodiment of the present invention. A logical block 550 is mapped to a physical block 560, which may be known as a "current" or "old" physical block. Specifically, contents associated with pages 552 within logical block 550 are stored in a data area 568 of pages 562 of physical block 560 as contents 564. When pages 562 within physical block 560 are full (as shown), or physical block 560 is otherwise unable to accept an update associated with logical block 550, a new or spare physical block 570, which includes pages 572, may be obtained, as for example from a set of spare blocks maintained within an overall non-volatile memory system. In most cases, at least some contents 564 stored in physical block 560, along with any updates associated with logical block 550 that are not stored into physical block 560, may be provided into physical block 570 through the use of a copy operation or a merge operation. Specifically, any contents 564 which are not effectively usurped by updates associated with logical block 550 may be provided into physical block 570 along with the updates. In one embodiment, when substantially all contents 564 are effectively usurped by updates associated with logical block 550, then essentially no contents 564 are stored into physical block 570. As will be appreciated by those skilled in the art, a copy operation may be suitable when no new data which is not included in physical block 560 is to be provided to physical block 570, while a merge operation may be suitable when new or updated data which is not included in physical block 560 is to be included in physical block 570.

Each page 562 in physical block 560 includes a redundant or overhead area 566. Similarly, each page 572 in physical block 570 also includes a redundant or overhead area 576. In the described embodiment, redundant area 566a, which is associated with a first page 562a of physical block 560, includes a set of bits which form an update index 568. It should be appreciated, however, that any number of redundant areas 566 of physical block 560 may include an update index, e.g., redundant area 566b may include an update index 588 which has the same value as update index 568.

Until physical block 570 is associated with logical block 550, as for example through identifying bits set in at least one redundant area 576 associated with physical block 570, physical block 570 is generally empty. However, once physical block 570 is associated with logical block 550, an update index 578 is stored into redundant area 576a which corresponds to a first page 572a of physical block 570. It should be appreciated that additional update indexes, as for example, update index 598 which is stored into redundant area 576b and has the same value as update index 578, may be stored in physical block 570.

Update index 578 generally is set to have a value which, when compared against update index 568, identifies physical block 570 as being newer or more newly associated with physical block 560. The use of update index 578 and update index 568 enables a determination to be made, after a loss of power to an overall system which includes physical blocks 560, 570, as to whether at least some contents 564 of physical block 560 were in the process of being provided to physical block 570. As shown, some contents 564a, 564b of physical block 560 have been provided as contents 564a', 564b', respectively, to physical block 570, while other contents which are intended to be provided have not been provided, e.g., contents 564d. In addition, updates associated with logical block 550 may be stored as contents 574 in physical block 570 when appropriate, e.g., when contents 574 are intended to replace contents 564c.

When both physical blocks 560, 570 are associated with logical block 550 after a loss of power, then the indication may be that an operation to provide some contents 564 of physical block 560 to physical block 570 has not been successfully completed. In the described embodiment, when update index 578 has a value that is understood to be newer, e.g., higher, than the value of update index 568, then the indication is that any contents 564 of physical block 560 which are to be provided to physical block 570 may not all have been successfully provided to physical block 570.

In the event that updates such as new or revised contents associated with logical block 550 effectively all usurp contents 564 of physical block 560, then none of contents 564 may be stored into physical block 570. As a result, if physical blocks 560, 570 are to be resolved, as for example during a power up after a loss of power, it may be determined that effectively none of contents 564 are to be merged into physical block 570.

In general, to substantially minimize the amount of data that may be lost as a result of an interrupted updating, copying, or merging process between physical blocks 560, 570, update index 568 of physical block 560 and update index 578 of physical block 570 may be studied to identify physical block 570 as the new physical block. As such, update index 578 is typically stored into physical block 570 when physical block 570 is obtained, e.g., when an updating, copying, or a merging process is to be implemented with respect to physical block 560.

Figure 7:
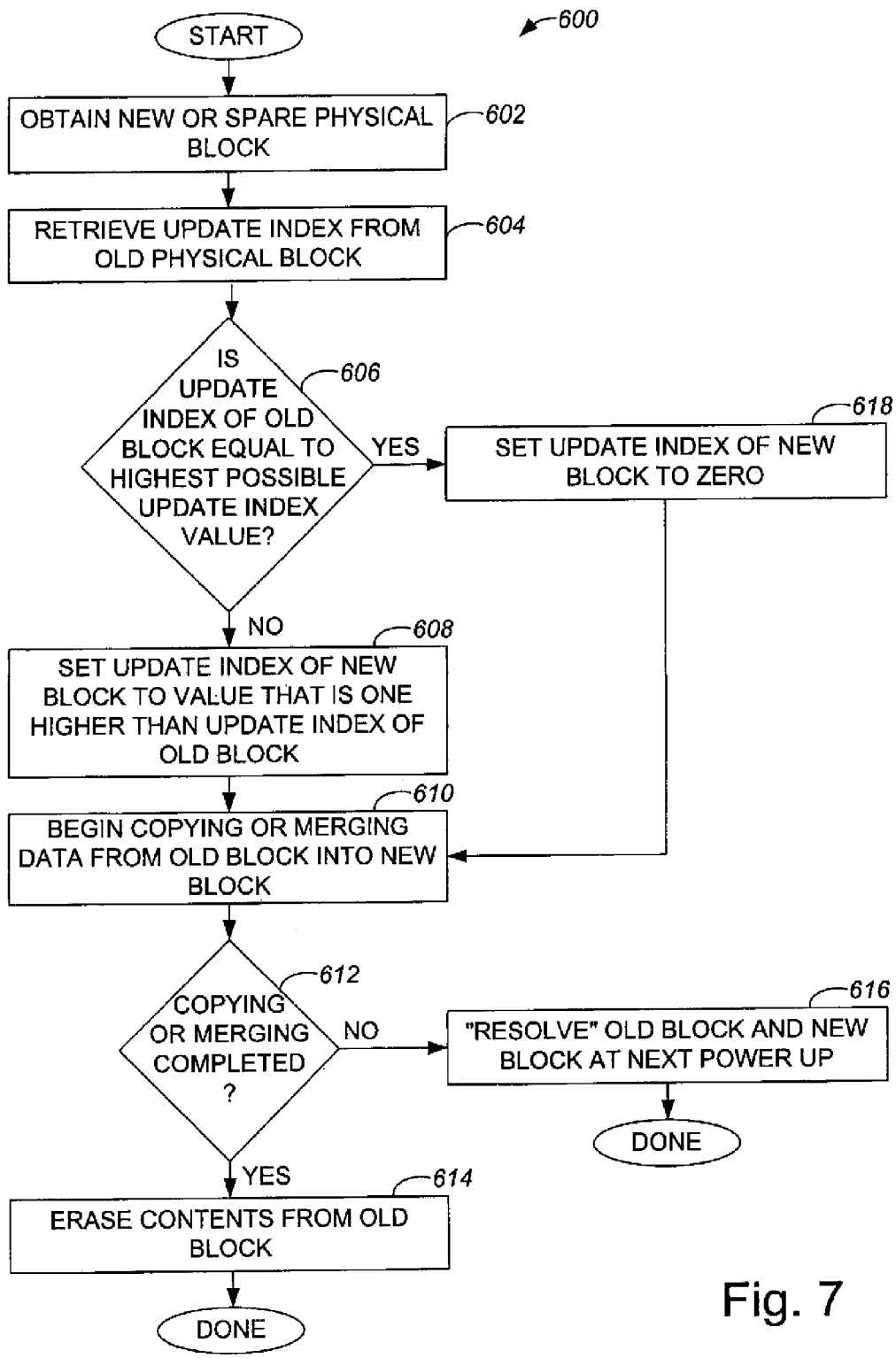
FIG. 7 is a process flow diagram which illustrates the steps associated with initiating an updating, a copying, or a merging process in accordance with an embodiment of the present invention.

With reference to FIG. 7, the steps associated with one method of updating, copying or merging the contents of one physical block into another physical block will be described in accordance with an embodiment of the present invention. A process 600 of copying or merging blocks begins at step 602 in which a new or spare physical block is obtained. Specifically, a spare physical block is obtained to be a new physical block which is to be associated with, or otherwise correspond to, a logical block. Once the new or spare block is obtained, the update index of an "old" physical block, or the physical block which is currently associated with the logical block with which the new physical block is to be associated, is retrieved in step 604. In the described embodiment, an update index is stored as bits, e.g., four bits, in the redundant area associated with a physical block. As such, retrieving the update index of the old physical block typically includes obtaining the update index from a redundant area or an overhead area associated with the old physical block. It should be appreciated that the update index for a physical block may either be stored in the redundant area of substantially only one page, e.g., a first page, of the physical block, or the update index may be stored in the redundant area of substantially every page in the physical block.

After the update index of the old physical block is retrieved, a determination is made in step 606 regarding whether the update index of the old physical block is substantially equal to the highest possible update index value. In an embodiment in which an update index includes four bits, the highest possible update index value may be fifteen, although the highest possible update index value may vary widely. If it is determined that the update index of the old physical block is not substantially equal to the highest possible update index value, then process flow moves from step 606 to step 608 in which the update index of the new physical block is set to a higher value than the update index of the old physical block. Typically, setting the update index of the new physical block to a higher value than the update index of the old physical block involves setting the update index of the new physical block to a value that is one higher than the update index of the old physical block. It should be appreciated that setting the update index of the new physical block generally also includes storing the update index into a redundant area associated with the new physical block. In general, rather than determining when the update index of the new physical block is set to a higher value than the update index of the old physical block, it may instead be determined when the update index of the new physical block is set to a newer value than the update index of the old physical block.

After the update index of the new physical block is set, an updating, copying, or merging process, as appropriate, is initiated in step 610 to update, to copy, or to merge data, respectively, from a set of new user data and/or the old physical block into the new physical block. It is then determined in step 612 whether the updating, copying, or merging process has successfully completed. Such a determination may be based on whether all current logical pages are accounted for in the new physical block. When it is determined that the copying or merging process has been successfully completed, the indication is that the most up-to-date data associated with the logical block which corresponds to the old physical block has been placed into the new physical block. As such, the new physical block becomes the physical block which corresponds to the logical block, and the contents of the old physical block are erased in step 614. Once the contents of the old physical block are erased, the process of updating, copying, or merging blocks is completed.

Alternatively, if it is determined in step 612 that an updating, a copying, or a merging process to merge data into the new physical block has not been successfully completed, then the implication is that the updating, the copying, or the merging process has been interrupted, as for example by a loss of power to the non-volatile memory device which includes the old physical block and the new physical block. As a result, the old physical block and the new physical block may both correspond to the same logical block. For example, both the old physical block and the new physical block may include a bit or bits in their redundant areas which identify the same logical block. In the described embodiment, when it is determined that a logical block has two corresponding physical blocks, the two corresponding physical blocks may effectively be resolved during the next power up process step 616. That is, contents of the old physical block and the new physical block may be resolved such that the most recent contents associated with the logical block that the old physical block and the new physical block correspond to may be copied or merged such that the most recent contents are placed in the new physical block. One method of resolving an old physical block and a new physical block will be discussed below with reference to FIG. 8. Once the old physical block and the new physical block are resolved, the process of updating, copying, or merging blocks is completed.

Returning to step 606, if it is determined that the update index of the old physical block is substantially equal to the highest possible update index value, then the update index of the new physical block may be set to a value of zero in step 618. When the update index of the old physical block is substantially equal to the highest possible update index value and the update index of the new physical block is set to zero, the indication is that the new physical block is newer than the old physical block. After the update index of the new physical block is set, process flow proceeds to step 610 in which the copying or the merging of data from the old physical block into the new physical block is initiated.

Figure 8:
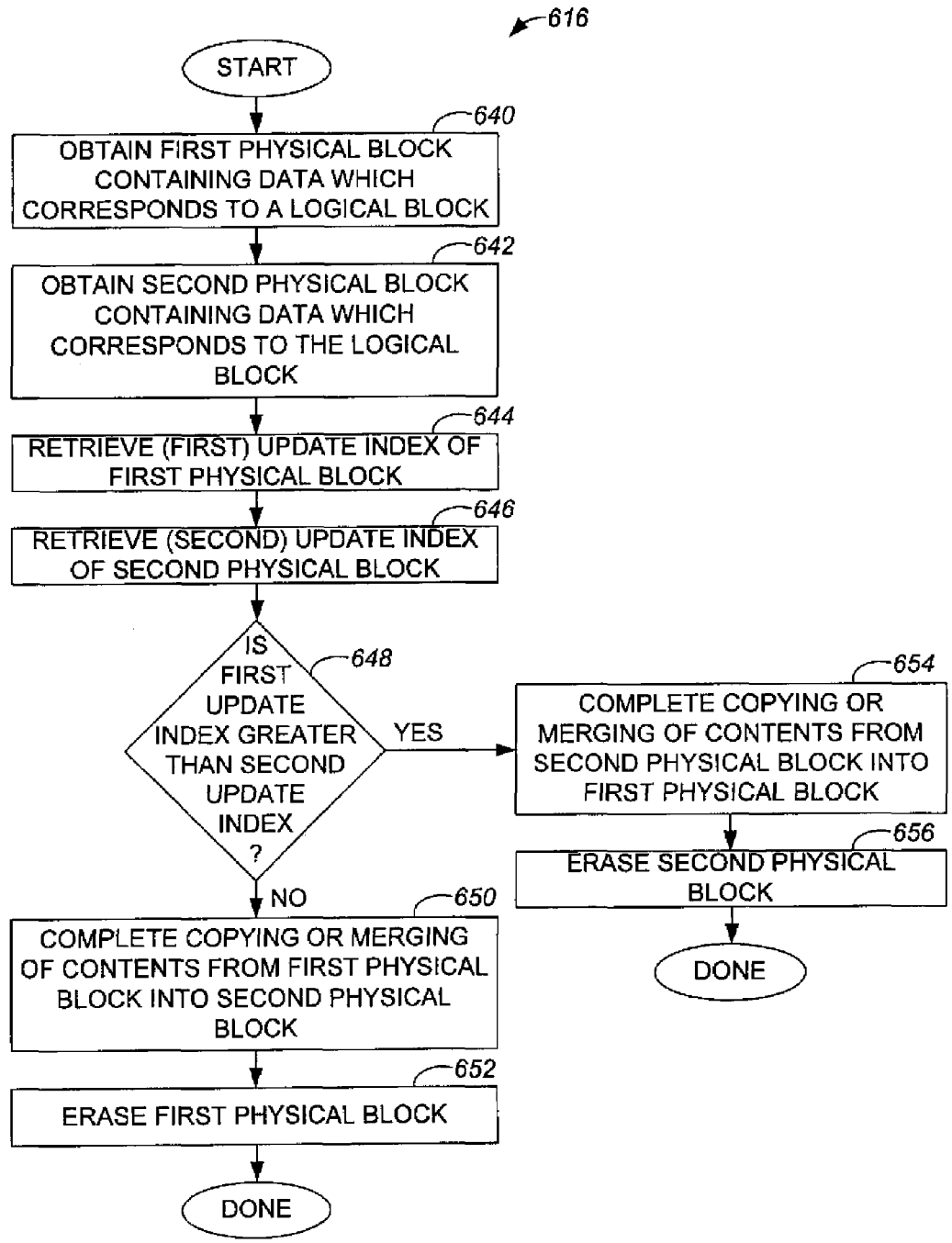
FIG. 8 is a process flow diagram which illustrates the steps associated with resolving an old block and a new block, e.g., step 616 of FIG. 7, in accordance with an embodiment of the present invention.

FIG. 8 is a process flow diagram which illustrates the steps associated with resolving an old block and a new block, e.g., step 616 of FIG. 7, in accordance with an embodiment of the present invention. A process 616 of resolving two physical blocks which correspond to the same logical block begins at step 640 in which a first physical block that contains data which corresponds to the logical block is obtained. It should be appreciated that the first physical block may either be an old physical block or a new physical block. Once the first physical block is obtained, a second physical block which contains data that corresponds to the logical block is obtained in step 642.

In step 644, the update index of the first physical block, i.e., the first update index, is retrieved. The update index is generally stored in at least one of the redundant areas associated with the first physical block. Typically, the update index is retrieved from the redundant area of the first page of the first physical block. The update index of the second physical block, i.e., the second update index, is retrieved or otherwise obtained in step 646.

After the first update index and the second update index are obtained, the first update index and the second update index may be compared. Accordingly, in step 648, a determination is made as to whether the value of the first update index is greater than the value of the second update index. It should be appreciated that even if the first update index has a value of zero, the first update index may be greater than the second update index if the second update index has a value that is the maximum value of the updated index, and vice versa. If it is determined that the first update index is not greater than the second update index, then the indication is that the second physical block is a new physical block. In other words, the implication is that the contents of the first physical block were being updated, copied, or merged into the second physical block when the copy or merge process was interrupted. Hence, process flow moves from step 648 to step 650 in which a copying or merging process, as appropriate, is completed to complete the updating, copying, or merging of contents associated with the first physical block into the second physical block. Completing an updating, copying, or merging process may include identifying pages which have contents in the first physical block but have no contents in the second physical block, and providing such contents to the second physical block.

Once the copying or merging of contents into the second physical block is completed, the first physical block is erased in step 652. Erasing the first physical block generally includes erasing the updated index of the first physical block, as well as substantially disassociating the first physical block from the logical block that is now associated with the second physical block. The process of resolving blocks is completed once the first physical block is erased.

Returning to step 648, if the determination is that the first update index is greater than the second update index, then the indication is that the first physical block is a new physical block while the second physical block is an old physical block. As such, in step 654, the updating, copying, or merging process which was previously not completed is completed to copy or merge, as appropriate, contents of the second physical block into the first physical block. Once the first physical block contains the most recent or current contents associated with the logical block with which the first physical block is associated, e.g., the logical block identified in at least one redundant area of the first physical block, the second physical block is erased in step 656, and the process of resolving blocks is completed.

Figure 9:
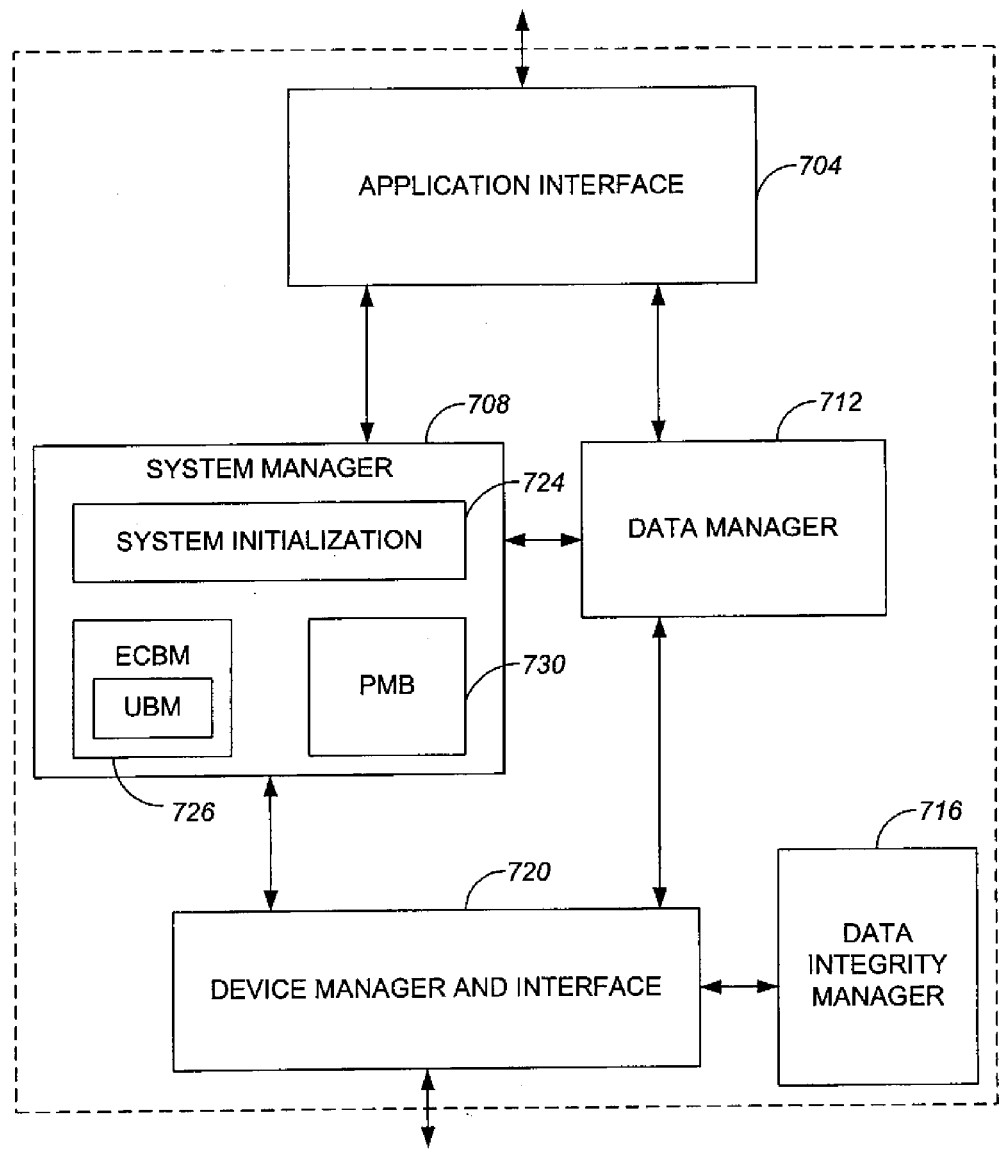
FIG. 9 is a diagrammatic block diagram representation of a system architecture in accordance with an embodiment of the present invention.

In general, the functionality associated with maintaining update indexes and resolving blocks through the use of update indexes is provided in software, e.g., as program code devices, or as firmware to a host system. One embodiment of a suitable system architecture associated with the software or firmware provided to a host system to enable wear leveling to occur is shown in FIG. 9. A system architecture 700 generally includes a variety of modules which may include, but are not limited to, an application interface module 704, a system manager module 708, a data manager module 712, a data integrity manager 716, and a device manager and interface module 720. In general, system architecture 700 may be implemented using software code devices or firmware which may be accessed by a processor, e.g., processor 108 of FIG. 2.

In general, application interface module 704 may be arranged to communicate with the host, operating system or the user directly. Application interface module 704 is also in communication with system manager module 708 and data manager module 712. When the user wants to read, write or format a flash memory, the user sends requests to the operating system, the requests are passed to the application interface module 704. Application interface module 704 directs the requests to system manager module 708 or data manager module 712 depending on the requests.

System manager module 908 includes a system initialization submodule 924, an erase count block management submodule 926, and a power management block submodule 930. System initialization submodule 924 is generally arranged to enable an initialization request to be processed, and typically communicates with erase count block management submodule 926. Erase count block management submodule 926 includes functionality to cause erase counts of blocks to be stored, and functionality to cause an average erase count to be calculated, as well as updated, using individual erase counts. The use of erase counts is described in co-pending U.S. patent application Ser. No. 10/281,739, filed Oct. 28, 2002, which is incorporated herein by reference in its entirety. System initialization module 724 is also arranged to resolve a one-to-many logical-to-physical block assignment and, hence, may utilize update indexes.

In addition to being in communication with application interface module 704, system manager module 708 is also in communication with data manager module 712, as well as device manager and interface module 720. Data manager module 712, which communicates with both system manager module 708 and application interface module 704, may include functionality to provide sector mapping which effectively translates logical sectors into physical sectors. That is, data manager module 712 is arranged to map logical blocks into physical blocks. Data manager module 712 is arranged to map logical blocks into physical blocks. Data manager module 712 may also include enables groups within blocks to be managed, as descried in co-pending U.S. patent application Ser. No. 10/281,855, filed Oct. 28, 2002, which is incorporated herein by reference in its entirety.

Device manager and interface module 720, which is in communication with system manager module 708, data manager 712, and data integrity manager 716, typically provides a flash memory interface, and includes functionality associated with hardware abstractions, e.g., an I/O interface. Data integrity manager module 716 provides ECC handling, among other functions.

Although only a few embodiments of the present invention have been described, it should be understood that the present invention may be embodied in many other specific forms without departing from the spirit or the scope of the present invention. By way of example, while logical groups within logical blocks and corresponding physical groups within physical blocks have been described as being substantially the same size, logical groups and physical groups may generally be of different sizes. In other words, the number of pages included in a logical group and the number of pages included in a physical group that corresponds to the logical group may not necessarily be the same.

While an update index has been described as including four bits, it should be appreciated that the update index may generally take any number of bits. For instance, an update index may include fewer than four bits, or the update index may include more than four bits, e.g., up to approximately one byte or more. The number of bits may be selected based on any number of reasons which include, but are not limited to, overall system requirements and the number of bits available within redundant areas of physical blocks within the overall system.

In general, substantially any difference between update indexes of physical blocks may be used to determine which of a plurality of physical blocks is an unfinished block, or the block into which current data is to be updated, copied, or merged. Although a physical block with a higher update index has been described as being the newer, e.g., unfinished block, the physical block with a lower update index may instead be the newer block, e.g., if an update index of a spare physical block is set to a value that is less than the update index of a current physical block when the spare physical block is obtained. Similarly, bits within the update index may be rotated or otherwise shifted to provide different "values" for update indexes that may be used to determine which update index is associated with a newer block.

After update indexes are used to determine which of a plurality of physical blocks is a new or spare physical block and which of the plurality of physical blocks is an old physical block, a copy or a merge operation may effectively be restarted to complete the process of providing, e.g., updating, copying, or merging, information into the spare physical block. In one embodiment, prior to restarting the update, copy, or merge operation, the contents of the spare physical block may be erased, and the update index of the spare physical block may be reset to a value that is newer, e.g., higher, than the value of the update index of the old physical block without departing from the spirit or the scope of the present invention. Erasing the spare physical block, while time-consuming, may reduce the need to determine which contents of the old physical block have already been provided to the spare physical block, and which contents of the old physical block have yet to be provided to the spare physical block.

The steps associated with the various methods of the present invention may be widely varied. In general, steps may be added, removed, reordered, and altered. For instance, an update index may be retrieved from a physical block during a process to resolve physical blocks substantially immediately after the physical block is obtained.

In one embodiment, since an old physical block is substantially always erased after the completion of a copying or a merging process, if power is cut to the system which includes the old physical block and a corresponding new physical block, then the old physical block and the new physical block will generally still be associated with a single logical block. As such, it should be appreciated that a determination of whether a copying or a merging process has completed successfully may include determining whether there are still two physical blocks associated with a single logical block without departing from the spirit or the scope of the present invention. Therefore, the present examples are to be considered as illustrative and not restrictive, and the invention is not to be limited to the details given herein, but may be modified within the scope of the appended claims.

What is claimed is:

1. A method for operating a non-volatile memory system that includes a NAND flash memory array having a plurality of physical blocks, each physical block comprised of a plurality of memory cells arranged in a plurality of pages, each memory cell capable of storing more than one bit of data, so that partial writes of pages in the physical blocks are not allowed, the method comprising the steps of:
    associating a first physical block in the flash memory array with a logical block;
    writing data associated with the logical block, and a first update index value, to at least one page in the first physical block;
    then associating a second physical block with the logical block; and
    writing data associated with the logical block, and a second update index value, to at least one page in the second physical block, the second update index value indicating that the second physical block is more newly associated with the logical block than is the first physical block.

2. The method of claim 1, further comprising:
    obtaining the first update index value from the first physical block;
    obtaining the second update index value from the second physical block;
    comparing the first update index value with the second update index value to determine which of the first and second update index values indicates that its physical block is more newly associated with the logical block; and
    responsive to the comparing step determining that the second update index value indicating that the second physical block is more newly associated with the logical block than the first physical block, writing remaining data associated with the logical block to the second physical block.

3. The method of claim 2 wherein obtaining the first update index value includes obtaining the first update index value from an overhead area associated with the first physical block and obtaining the second update index value includes obtaining the second update index value from an overhead area associated with the second physical block.

4. The method of claim 2 wherein the step of writing data and the second index value to the second physical block comprises:
    retrieving data from the first physical block;
    writing the retrieved data to the second physical block; and
    writing the second update index value to at least one page to which the retrieved data is written.

5. The method of claim 2 further including:
    identifying that the first physical block is associated with the logical block; and
    identifying that the second physical block is associated with the logical block.

6. The method of claim 2 further including:
    erasing the first physical block after the writing step, wherein erasing the first physical block includes erasing the first update index value.

7. The method of claim 2 wherein the second update index value is further arranged to indicate that pages of the second physical block are substantially all more newly associated with the logical block than are pages of the first physical block.

8. The method of claim 1 wherein the first update index has a length of less than approximately one byte and the second update index has a length of less than approximately one byte.

9. The method of claim 1 further including, prior to the step of writing data and the second update index value;
    retrieving the first update index value from the first physical block; and
    determining the second update index value relative to the first update index value.

10. The method of claim 9 wherein the first update index value is written to and retrieved from a redundant area of the first physical block.

11. The method of claim 1 further including:
    after the step of writing data and the first index value to the first physical block, receiving data associated with the logical block.

12. The method of claim 11 wherein the step of writing the second update index value comprises writing to a redundant area of the second physical block.

13. The method of claim 12 wherein the second update index value occupies up to approximately one byte in the redundant area.

14. The method of claim 1 wherein the step of writing data and the second index value to the second physical block comprises:
    retrieving data from the first physical block;
    writing the retrieved data to the second physical block; and
    writing the second update index value to at least one page to which the retrieved data is written.

15. The method of claim 1, further comprising:
    receiving new data associated with the logical block, at least some of the received data corresponding to pages previously written in the first physical block but differing from the contents of those pages; and
    writing the received data to the second physical block.

16. A non-volatile memory system comprising:
    a non-volatile memory comprised of a plurality of memory cells in a NAND arrangement, the plurality of memory cells arranged in a plurality of pages in each of a plurality of physical blocks, each memory cell capable of storing more than one bit of data, so that partial writes are not allowed;
    means for associating physical blocks with logical blocks;
    means for writing information from a logical block, and an update index value, to at least one page in a physical block associated with the logical block;
    wherein the writing means writes a first update index to at least one page in a first physical block associated with the logical block, and writes a second update index value to at least one page in a second physical block associated with the logical block after a first physical block is associated with the logical block, so that the second update index value associated with the second physical block indicates that the second physical block is more recently associated with the logical block than is the first physical block.

17. The system of claim 16, further comprising:
    a memory area for storing:
        code devices for associating the second physical block with the logical block;

code devices for writing first and second update index values associated with the first and second physical blocks, respectively, so that the second update index value associated with the second physical block indicates that the second physical block is more recently associated with the logical block than is the first physical block; and code devices for writing information associated with the logical block to the second physical block; and a processor for processing the code devices.

18. The system of claim 17, further comprising:

code devices for comparing the first update index value with the second update index value to determine which physical block is more newly associated with the logical block;

and wherein the code devices for writing write information associated with the logical block to the second physical block responsive to the comparing code devices determining that the second physical block is more newly associated with the logical block.

19. The system of claim 18 wherein the first update index value is stored in an overhead area associated with the first physical block and the second update index value is stored in an overhead area associated with the second physical block.

20. The system of claim 16, further comprising:

means for comparing the first update index value with the second update index value to determine which physical block is more newly associated with the logical block;

and wherein the writing means writes information associated with the logical block to the second physical block responsive to the comparing means determining that the second update index value indicates that the second physical block is more newly associated with the logical block than is the first physical block.

21. The system of claim 20 wherein the first physical block includes a first overhead area storing the first update index value, and the second physical block includes a second overhead area storing the second update index value.

22. The system of claim 20 further including:

means for erasing the first physical block, including erasing the second update index value.

23. The system of claim 16 further including:

means for erasing the information and the first update index value from the first physical block.

24. The system of claim 16 wherein the second update index value is stored in a redundant area of the second physical block.

25. The system of claim 16, further comprising:

means for receiving new data associated with the logical block, the new data corresponding to pages previously written in the first physical block but differing from the contents of those pages;

means for writing the received data to the second physical block.

* * * * *